United States Patent
Bertin

[15] 3,662,854
[45] May 16, 1972

[54] HIGH-SPEED GROUND EFFECT VEHICLES

[72] Inventor: Jean Henri Bertin, Neuilly-sur-Seine, France

[73] Assignee: Bertin & Cie, Boite Postale Plaisir, France

[22] Filed: Nov. 6, 1969

[21] Appl. No.: 874,149

[30] Foreign Application Priority Data

Nov. 8, 1968  France................................173226

[52] U.S. Cl...............................180/121, 180/116, 180/117, 180/126
[51] Int. Cl.........................................B60v 1/08, B60v 1/04
[58] Field of Search...................180/117, 120, 126, 119, 121

[56] References Cited

UNITED STATES PATENTS

| | | | |
|---|---|---|---|
| 3,082,976 | 3/1963 | Dornier | 180/120 X |
| 3,191,705 | 6/1965 | Jones et al. | 180/126 |
| 3,221,831 | 12/1965 | Weiland | 180/117 |
| 3,220,501 | 11/1965 | Lande | 180/119 X |

FOREIGN PATENTS OR APPLICATIONS

| | | | |
|---|---|---|---|
| 955,923 | 4/1964 | Great Britain | 180/117 |
| 936,763 | 9/1963 | Great Britain | 180/117 |

*Primary Examiner*—A. Harry Levy
*Attorney*—Stevens, Davis, Miller & Mosher

[57] ABSTRACT

A ground-effect vehicle comprising air cushions normally confined by solid walls, the front and rear walls of the front and rear air cushions, symmetrically with respect to the longitudinal axis of the vehicle, including portions which are orientatable to permit the cushions to be supplied by ram pressure when the vehicle is travelling at high speed.

13 Claims, 12 Drawing Figures

HIGH-SPEED GROUND EFFECT VEHICLES

BACKGROUND OF THE INVENTION

This invention relates to ground-effect vehicles, and has for its object to improve the efficiency of these vehicles and to increase the speed which they can attain, while at the same time simplifying the production of the skirting arrangements which delimit the cushion and which extend substantially parallel to the normal direction of displacement of the vehicle, stabilizing the latter aerodynamically.

The invention also introduces a quite different concept into the design of these vehicles compared with the design concept upon which present operational A.C.V. are based.

The invention relates essentially to a rationalization of the arrangement involving the layout of the air-cushions and the air flow used to supply these cushions. It makes it possible to combine at zero speed or at moderate speed the advantages of cushions of pressurized fluid of the "plenum chamber" kind, defined by solid walls, and at high speed the advantages of utilizing to the full the dynamic pressure of the air or ambient fluid for lift of the vehicle. It also enables recovery of the ram momentum by appropriate layout of the air or fluid surface, thus enabling the transfer losses to be reduced to a minimum and the residual momentum to be used for propulsion.

As those skilled in the art will appreciate, the displacement of a vehicle of the ground-effect kind through the ambient air is resisted by aerodynamic forces the sum of which makes up the overall drag of the vehicle. This drag is obviously a loss which is subtracted from the force supplied by the propulsion system. This drag includes the pick-up or ram drag of the air, which is the loss fraction from the energy initially possessed by the intake fluid, which energy loss can be very large at high speeds.

This ram drag is due on the one hand, to the pressure losses experienced by the intake air in the ducting arrangements, and on the other hand to the fact that the air escapes from the cushion in all directions, the momentum which it has developed thus having a resultant of zero.

OBJECT OF THE INVENTION

The invention aims to make it possible to reduce these pressure losses by discarding the cushion supply ducts and/or reducing their lengths as far as possible, these ducts, when retained, furthermore involving only very slight or for that matter no changes in direction, and by directing towards the rear a substantial proportion of the leakage airflow so that said flow contributes to the propulsion of the vehicle.

BRIEF SUMMARY OF THE INVENTION

In accordance with one aspect of the invention, the upper lift surface of the confining area, or ceiling, of the air-cushions, extends symmetrically to either side of that part of the vehicle designed to carry the payload, and over part of the area of the said ceiling of the air-cushions, to either side of said payload part, at least one variable direction injector type static pump or venturi device is located, which device serves to supply air under pressure to the air-cushion below, while the lateral confining walls or skirts of the cushions comprise, at the front and the rear of the machine, portions which are likewise orientatable, that is to say variable in direction.

The facility for varying the direction of said wall portions and of said venturi devices makes it possible to regulate the airflow supplying the air-cushions in accordance with the speed of the vehicle.

The supplying of each air-cushion through at least one venturi opening to either side of the central payload or passenger-carrying part, and directing air into the cushion located therebelow, makes it possible to reduce to a minimum the distance travelled by the supplied air, in particular when stationary and at low speeds, while at high speeds the opening of the front and rear portions of the confining walls or skirts of the cushion enables direct supply by the ram effect to be achieved at the same time as the major part of the leakage flow is directed towards the rear of the machine, contributing to the thrust.

FURTHER FEATURES OF THE INVENTION

In accordance with another aspect of the invention, which arises out of the fact that it is expedient to provide, for the stability of the vehicle, not only air-cushions located at either side of the longitudinal vertical plane of symmetry (for roll stability), but also cushions located one behind the other from the front to the rear of the machine (for pitch stability) the confining walls of the cushion at the front and at the rear respectively comprise a front portion and a rear portion which are each orientatable, and, moreover, the wall separating two successive cushions comprises likewise an orientatable portion in order that, at high speeds, all the successive cushions can be supplied with air by the ram effect.

DESIGNATION OF DRAWINGS

The ensuing description relating to the accompanying drawing will indicate by way of a non-limitative example how the invention may be carried into practice.

In the drawings:

FIGS. 1 and 2 are schematic views illustrating the features of the invention;

FIG. 4 is a plan view of the machine;

FIG. 5 is a front elevation;

FIG. 11 shows a partial section of a device for controlling mobile elements or flaps;

FIG. 12 illustrates in section and on a larger scale, a detail of FIG. 11.

DESCRIPTION OF EMBODIMENT

Considering FIG. 1, there can be seen a wall $a$ which, located below the platform $b$ of a ground-effect vehicle, delimits beneath said platform an enclosure of generally cupped or bell-shaped form, for an air-cushion. The pressurized air is supplied to this enclosure through a duct $c$ connected to the delivery side of a pressurized air generator $d$, for example a compressor or a venturi.

As those skilled in the art will appreciate, this kind of device operates by its development, through the effect of the pressure of the top wall of the chamber delimiting the cushion, of a vertical force F which lifts the vehicle so that the wall $a$ clears the surface $g$ of the ground or water to a height at which an equilibrium condition is established. This condition is characterized by a certain leakage height between the surface $g$ and the bottom edge of the wall $a$. The air-cushions of this kind are referred to as "plenum chambers" or "bell cushions". They enable the vehicle to lift until contact between the solid parts of the vehicle and the ground or water is broken, and this gives rise to a number of known advantages.

In order to recover the dynamic pressure (ram pressure) of the surrounding fluid, it has been proposed that the intake $h$ for this fluid should be provided facing towards the front of the vehicle, the latter moving in the direction of the arrow $F_1$. At high-speed, the pressurized air generator $d$ can even be switched out and the air-cushion supplied solely by ram pressure. However the duct $c$, with its elbow or elbows, as well as the generator $d$, introduce pressure losses and thus reduce the efficiency of pick-up by the frontal orifice $h$.

In accordance with a feature of the invention, an intake orifice for the direct entry of air is formed in the wall of the cushion. This can be effected in the manner shown in FIG. 1 by designing that part of the solid wall $a$, which faces in the forward direction of the vehicle, in the form of a flap 1 which is of flexible type or is articulated at 2, so that the opening of this flap, at an adequate ram pressure, enables the air-cushion to be supplied directly. The pressurized air generator can then be switched out and the duct $c$ can even be closed off if desired.

On the other hand, if attention is not also given to the leakage flow from the air-cushion, it will be seen that with the conventional lay-out adopted in such an air-cushion, this flow, which escapes at the closed periphery formed by the edge of the wall $a$, produces a net thrust on the wall and on the vehicle of zero, i.e., the elementary thrusts have a zero resultant.

If, considering FIG. 2, where similar elements have been given similar references, there is provided, in that part of the wall $a$ which faces the rear of the vehicle, a flap 3 which is flexible or is articulated at the point 4, and if this flap is open beyond a certain vehicle speed, then the substantial flow which will escape towards the rear will then exert a thrust tending to reduce the pressure losses and enabling the efficiency of the system to be increased.

The arrangements shown in FIGS. 1 and 2 can be combined.

Thus, there will now be described, in relation to FIGS. 3 to 12, an embodiment of a ground-effect vehicle which employs the features hereinbefore described and which comprises other features in addition.

Figure 3:
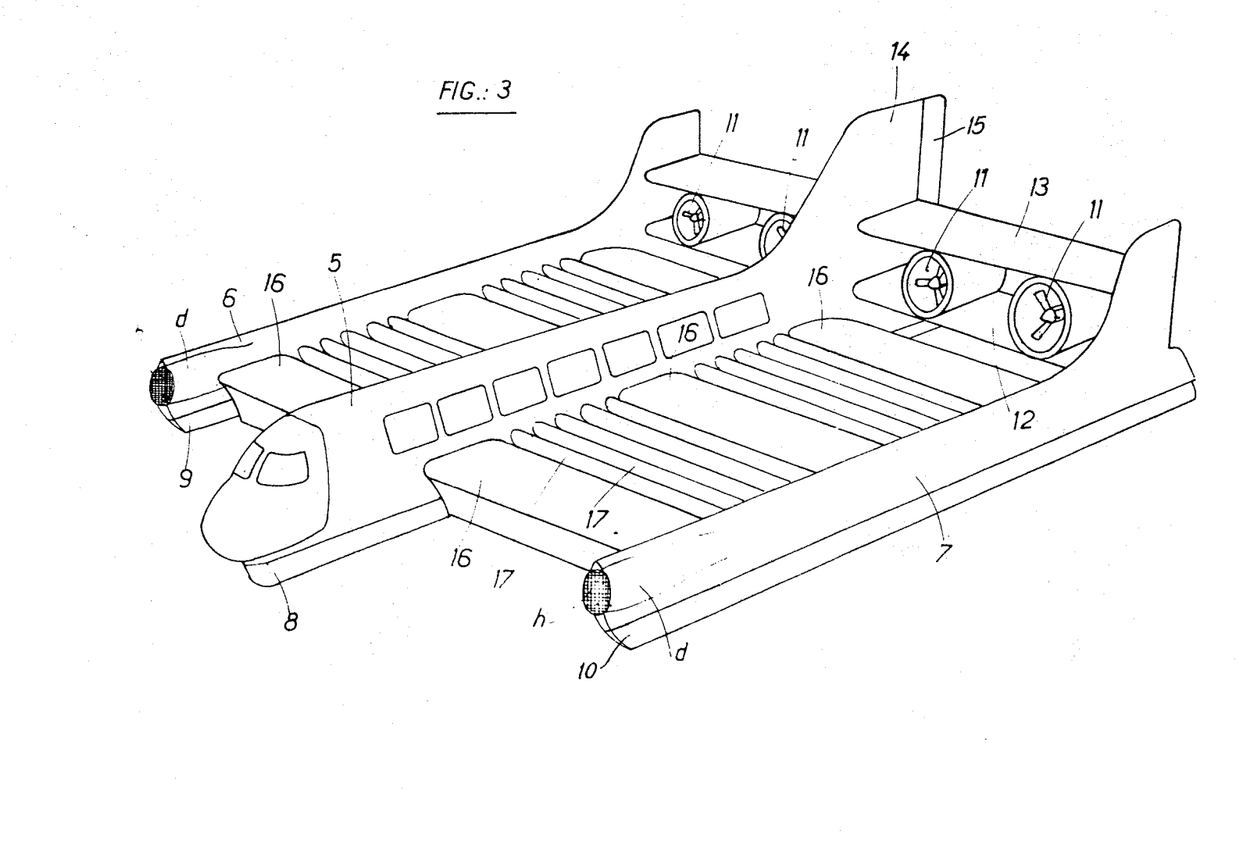
FIG. 3 illustrates, in perspective, an embodiment of a ground-effect vehicle in accordance with the invention.
Figure 6:
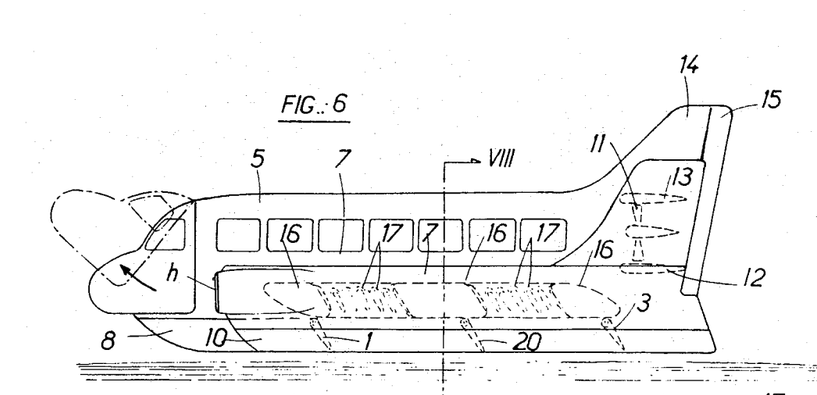
FIG. 6 is a side elevation.

This apparatus comprises a central body 5 of profiled form and designed, for example, substantially on the lines of an aircraft fuselage, thus to carry passengers as well as any other useful payload. To either side of the central body, between the same and the lateral faired formations 6 and 7, cushions of air or pressurized fluid, in particular two series of air-cushions, a detailed description of which will be given hereinafter, are provided. The central body 5, as well as the lateral fairings 6, 7, terminate at their bases in closed compartments 8, 9, 10, the wall of which in each case, is preferably made of a flexible material forming a skirt, in order to be inflatable, said compartments forming, in the rest condition, a sort of "pneumatic tyre" system through which the vehicle can rest upon the ground or which can also serve as buoyancy devices when the vehicle is resting on water.

The fairings 6, 7 can be provided at their front ends with air-intake orifices $h$ for supplying pressurized fluid to generators $d$ located downstream of said orifices.

In the example shown, four ducted fans 11 are provided at the rear of the vehicle for propulsion purposes, these fans or air-screws being located between the wings 12, 13 of a biplane arrangement serving as a vertical stabilizer and consequently being appropriately designed for this purpose. These air-screws can be provided at other locations on the vehicle in order to give it an appropriate nominal attitude in operation.

The propulsion can equally well be provided by other means, for example by dual-flow gas turbine jet engines.

The central body 5 is also terminated, at the rear, by a vertical fin 14 and a rudder 15.

The terminal or top boundary of the cushion, at the side opposite the supporting surface (ground or water) is formed in part by hollow rigid members 16, numbering three in the example, which connect with one another the central body 5 and the lateral fairings or booms 6, 7, and in part by hollow profiled bodies 17 extending between said members and parallel thereto from the central body 5 up to each of the lateral fairings or booms 6 or 7.

Figure 9:
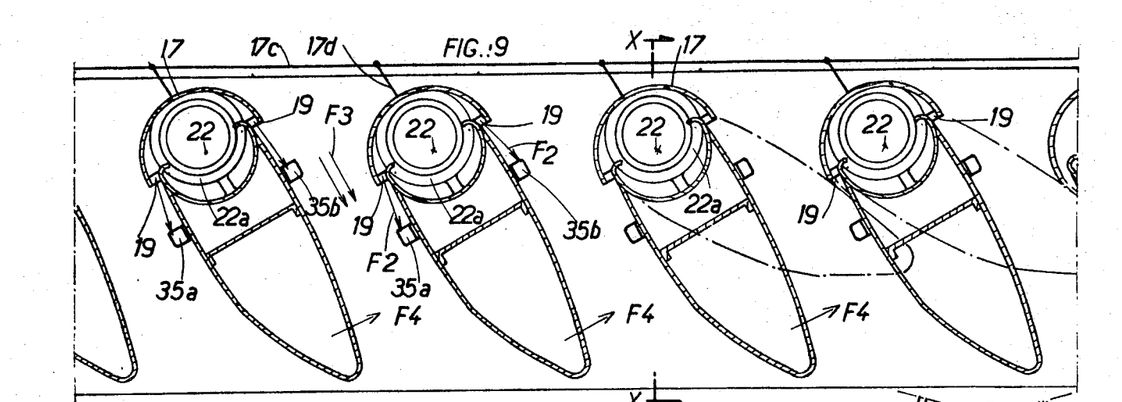
FIG. 9 again on a larger scale and in section similar to that shown in FIG. 7, illustrates the detail of the fairings carrying the bores which form the intake jets of the venturis.
Figure 10:
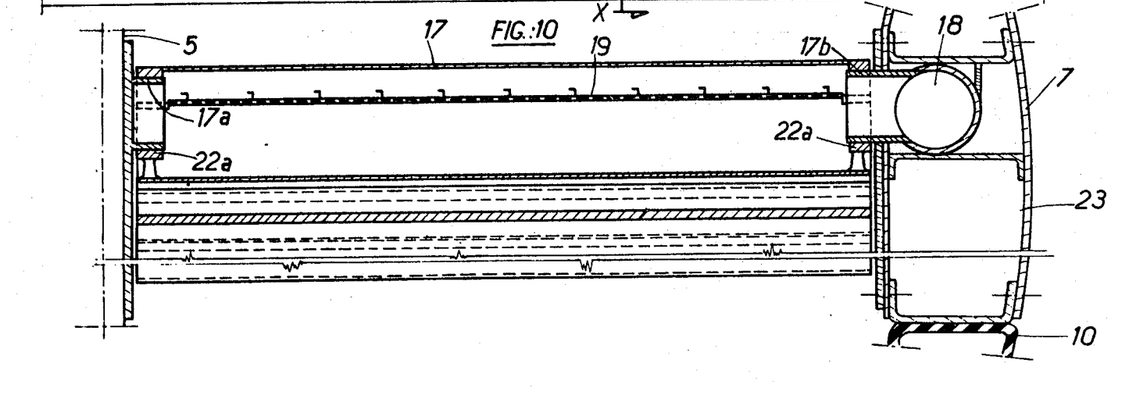
FIG. 10 is a section through one of these fairings taken on the line X—X of FIG. 9.

These hollow bodies serve to supply fluid under pressure, produced by the generators $d$, and to this end are connected at one end to a duct 18 extending along each of the booms 6, 7 (see FIG. 10). At each side, over the whole of their length, they contain a nozzle or injector 19 of slot form directed towards the plenum chamber or the like of the cushion. Each of these nozzle devices serves to produce a high-velocity jet of fluid (arrow $F_2$, FIG. 9), which entrains air or the surrounding fluid (arrow $F_3$, FIG. 9) by a venturi effect, so that the mixture of injected fluid and entrained ambient fluid is delivered to the cushion.

The profiles of the bodies 17 are determined in such manner that each space between two successive bodies defines the conventional convergent-divergent shape of a venturi. They can be maintained in position by cylindrical stubs 17a and 17b and possibly by brackets 35a, 35b, the arrangement possibly being such that it enables the hollow bodies to expand if required.

The members or beams 16 can likewise be fitted with half-sections 16a (FIG. 7) on their walls, the interior of these sections likewise being connected to the duct 18 and containing a nozzle or injector arrangement 19 for producing a jet.

Beneath the forward member, there is located a flap 1 which extends between the central body 5 and each of the fairings or booms 6 and 7. This flap is articulated at the point 2.

Beneath the rear member 16, a flap 3 is similarly arranged, articulated at 4. In this arrangement will be recognized the combination of flaps already referred to in FIGS. 1 and 2.

Figure 7:
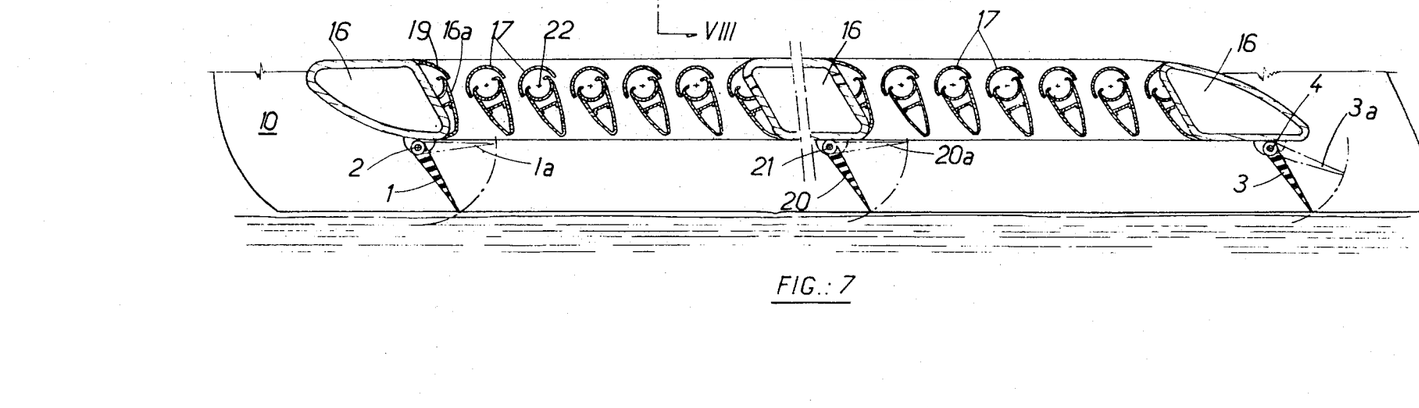
FIG. 7 is a longitudinal section on a larger scale, taken on the line VII—VII of FIG. 4.
Figure 8:
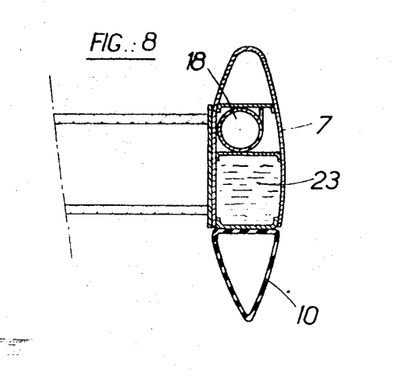
FIG. 8 is a transverse detailed section on the line VIII—VIII of FIG. 6, on a likewise enlarged scale.

An appropriate device can be used to place the flaps either in the position shown in full line, or in a more or less retracted position, the position of maximum retraction being indicated by chain-dotted lines in FIG. 7 at 1a and 3a.

It will be seen that, at one side of the central body 5, the corresponding flaps 1 and 3 delimit, in relation to the bottom structure 8 of the central body, and the bottom structure 9 or 10 of the fairing 6 or 7, as well as in relation to the members 16 and the profiled bodies 17, a cupped or bell-shaped enclosure which defines a cushion of pressurized fluid. This cushion is of the "plenum chamber" kind when the flaps occupy the position shown in full line.

Since there is a cushion of pressurized fluid at either side of the central body 5 and since the supply to these cushions is independent, the transverse stability is ensured. In order to secure longitudinal stability, each of these two cushions of pressurized fluid can be sub-divided into two longitudinally spaced cushions by providing beneath the central member 16 an intermediate flap 20 articulated at 21 and designed in the same way as the flap 1. In this manner, full automatic stabilization or trimming is achieved.

FIGS. 11 and 12 illustrate a possible embodiment of the arrangement used to control the flaps, as well as coupling between these.

In this embodiment, the opening of the flaps is effected automatically under the effect of the ram pressure of the air when the vehicle is moving.

This effect is exerted upon the flap 1, which then pivots about its axis 2 in the direction of the arrow $F_4$. Through the medium of the coupling link 24 articulated to the flap 1 and to the flap 20, the rotation of the flap 1 is transmitted to the flap 20. It is also transmitted to the flap 3, but this after a certain delay and in a reduced degree. To this end, the flap 20 is connected to the flap 3 by a telescopic link 25, one of the parts of said link comprising a cylinder 28 in which a piston 30 can displace, the piston being connected to the other part 29 of said link.

As FIG. 12 shows, the piston 30 contains a bore 32 establishing communication between the cylinder 28 and the surrounding atmosphere by virtue of the clearance between the rod 29 and the wall 33 of cylinder 28. Under these circumstances, when flaps 1 and 20 rotate in the direction of arrow $F_4$, leaving the position shown in FIG. 11, the movement of the component 25, articulated to flap 20, is not immediately transmitted to the component 29 and therefore to the flap 3, the air which fills the cylinder 28 first of all escaping to atmosphere through the bore 32 and the clearance 33. The movement of the flaps 1 and 20 is only transmitted to flap 3 when the piston 30 comes up against the wall 31. Accordingly, there is both delay in the opening of the flap 3 until such time as a substantial ground pressure has caused the flaps 1 and 20 to pivot through a substantial angle, and in final pivoting of the flap 3 through a lesser angle than that through which the flaps 1 and 20 pivot, the whole system being designed in order to maintain in the plenum chamber or the like a static pressure sufficient to maintain the vehicle in the lifted condition.

Dampers or dashpots 26a and 26b prevent any vibration or movement by the flaps and at the same time "harden" the rotational deflection of the flaps to a suitable degree, in the case of the flap 1 so that it only operates at a sufficiently high dynamic pressure and in the case of the flap 3 so that it resists the friction of piston 30 and cylinder 28 as well as the air pressure in said cylinder at the start of the travel of the component 25.

Stops 27 fix the positions of the flaps 1, 20 and 3 while the machine is moving at low speed and while the cushions operate as ordinary plenum chamber cushions.

The return of the flaps into this position can be effected in a variety of ways. For example, one of the flaps 1 or 20, if their own weight is insufficient to return them, can be returned by means of a mechanical or hydraulic control arrangement.

The control of the flap 3 can also be independent of that of the flaps 1 and 20, the telescopic link 25, 29 then being discarded. A special control element, such as a jack for example, can be provided in order to enable the pilot to operate said flap.

The operation of the device is as follows:

In the rest condition, the apparatus rests on the ground or on the water through the medium of the flexible walls 8, 9 and 10. These walls are more or less immersed when the vehicle is resting on water, as are the tips of the flaps 1, 3 and 20, which are in the positions shown in full line.

It may be advantageous for these lower extremities of the walls 8, 9 and 10 to be at a lower level than the free edges of the flaps in order to prevent the latter from touching the ground in the rest condition with consequent possibility of damage to them.

When it is desired to start up the vehicle, the generators d are set into operation in order to supply the blower slots 19 in the bodies 17. The venturis, constituted by the combinations of these bodies, draw in ambient air and deliver it under pressure to the chambers defining the air-cushions. The vehicle is then lifted away from contact with the ground or water. By then starting up the air-screws 11, the vehicle is caused to move in the desired way.

It will be observed that although, in this manner, the intake of air is not entirely except frontal as far as the supply to the generators d is concerned, it is nevertheless effected obliquely, with only very minor change in direction, because of the inclination of the bodies 17, this inclination being shown in FIGS. 7 and 9.

When the speed has increased sufficiently, the opening of flaps 1 and 20 in order to supply the air-cushions with the ram pressure can be commenced, and the opening of flaps 3 likewise in order to enable the air to escape towards the rear.

At high speeds, the cushions can be supplied virtually by the ram pressure alone. The front flap 1 and the intermediate flap 20 are completely retracted, as shown in chain-dotted line in FIG. 7, while the rear flap 3 is in an intermediate position.

Part of the fluid used to supply the cushion is then used for the lift function and the remainder escapes beneath the free edge of the rear flap 3, contributing to the propulsion of the vehicle.

In this configuration, the dynamic pressure is applied over the whole of the area offered between the forward member 16, the water or ground, the central body 5 and the corresponding boom 6 or 7.

This kind of aerodynamic design makes it possible very easily to reach speeds in excess of 200 km/h with propulsion means which would only move present-day A.C.V. at substantially lower speeds.

If the hollow bodies 17 are fixed (this is the case when the brackets 35a, 35b shown in FIG. 9 are present), the upward movement of the fluid taken in can be prevented either by continuing to supply injected jets through the slots 19 and at the same time reducing the pressure of these jets, or by sealing off the spaces between the bodies 17. For example, kinds of curtains could be designed similar to roller blinds the cylinders of which would be formed in the member 16 and which would completely close off above and below the bodies 17 the intervals between successive members. It is also possible to design the bodies 17 in such fashion that each of them can pivot about a transverse axis the line of which is indicated at 22 in FIGS. 7 and 9. It will be seen in FIG. 10 that each hollow body is assembled at its ends by means of a collar 22a on a fixed cylindrical stub 17a, 17b upon which it can therefore pivot (the brackets 35a, 35b being discarded in this case). The pivoting of the hollow bodies in the direction of the arrow $F_4$, FIG. 9, makes it possible, as those skilled in the art will appreciate, to reduce the interval between the successive bodies and, in the limiting condition, to close it up altogether, the hollow bodies then resting against one another in the manner shown in chain-dotted fashion in the right-hand part of FIG. 9.

Control of the pivoting of the hollow bodies can be effected in a variety of ways. For example, they can carry arms 17d connected with one another by links (as shown in dotted line at 17c) and operated by the pilot, either directly or through a servomotor.

With devices of this kind, at high speeds the injected jets can of course be stopped.

The structures described lend themselves furthermore to a variety of designs. For example, part of the volume of the lateral booms 6, 7, above the inflatable portions 9 and 10, can be used to do duty as a fuel reservoir, as shown at 23 in FIG. 8.

In addition to the advantageous indicated, the vehicle described exhibits others too. It is well known, for example, that ground-effect vehicles of conventional design make it possible to employ a light payload platform because of the distribution of the lift forces over virtually the whole of the area of said platform. However, this advantage is offset by the necessity to distribute the weight of the payload equally over the whole of the area of the platform. In a machine in accordance with the invention, the payload part, in other words the central body 5 and for that matter the booms 6 and 7 as well, and also the rear biplane arrangement 12, 13, is not superimposed upon the lift system but is arranged side by side therewith. The part carrying the payload is therefore the only part which requires any strengthening and this adds very little to the all-up weight of the vehicle.

Moreover, the designer is free to select the lift systems to be greater or larger as the case may require, that is to say to appropriately select the interval between the central body and the lateral booms. This provides a large margin in the choice of the pressure required in the fluid cushions for a given payload, as well as in the design conception of the various parts of the structure.

It will be appreciated that the embodiments described are merely examples and are open to modification in various ways within the scope of the invention as defined by the appended claims.

I claim:

1. A surface effect vehicle movable over a ground or sea surface with the interposition of a cushion system formed between said surface and a hard ceiling structure incorporated in said vehicle, comprising:

a transverse leading flap depending from a front portion of said ceiling structure and forming a front boundary wall for said cushion system, said leading flap being rearwardly pivotable as said vehicle gathers speed, a transverse trailing flap depending from a rear portion of said ceiling structure and forming a rear boundary wall for said cushion system, said trailing flap being rearwardly pivotable as said vehicle gathers speed, and an injector-type static pump system in said ceiling structure comprising pivotal wall means defining a venturi-like passage extending from top to bottom across said ceiling structure with a top air intake end opening into the ambient atmosphere and a bottom discharge end opening into said cushion system and nozzle means intermediate said ends for forming an air-entraining power jet, said venturi-like passage being rearwardly inclined from top to bottom and being further inclinable with said wall means being rearwardly pivoted as said vehicle gathers speed, whereby the general assembly of said leading flap, said trailing flap and said static pump system rearwardly pivot in conjunction as the vehicle gathers speed.

2. A ground-effect vehicle according to claim 1, wherein said wall means comprise a plurality of hollow profiled bodies each said body separated from one another by a predetermined interval and connected to a source of pressurized fluid, each of said bodies being equipped with said nozzle means, said nozzle means being in the form of tangential slots in each said body for injecting said jets of pressurized fluid into said passage to cause air to flow into said cushion system, said general assembly being retractable, as said vehicle gathers speed, substantially parallel to the normal direction of displacement of the vehicle, means also being provided whereby the ceiling of the cushion system can be closed off from said hollow bodies defining said venturi like passages.

3. A ground-effect vehicle according to claim 1, including a central fuselage body and lateral fairings, said cushion system comprising air-cushions extending between said body and each said fairing.

4. A ground-effect vehicle according to claim 3, wherein the ceiling of each of the spaces defining the air-cushions comprises said injector type static pump system and includes transverse members which connect said central body and said lateral fairings, and between which there are located said wall means comprising hollow bodies forming said venturi-like passages, said front and rear transverse flaps being located at each side of the central body between said body and a corresponding one of said fairings, and wherein said central body and said fairings comprise at their bases a flexible inflatable portion acting as a kind of "pneumatic tyre" through which the vehicle is supported at rest upon the supporting surface.

5. A ground-effect vehicle according to claim 1, wherein means are provided for pivoting said leading and trailing flaps, said means comprising hydraulic jack means, and means for rendering said jack means inoperative so that the positions of said flaps are defined by the ram pressure of the air when the vehicle gathers speed.

6. A ground-effect vehicle according to claim 1, wherein said leading and trailing flaps are provided with means connecting one with the other, said connecting means including means secured to said leading flap to cause said trailing flap to move with a predetermined degree of lag.

7. A ground-effect vehicle according to claim 6, wherein the said last mentioned means comprises a telescopic link and means to retard telescopic movement of said link and thereby act as a dashpot damper.

8. A vehicle as claimed in claim 1, further comprising a mechanical linkage associated with said leading flap and said trailing flap for synchronizing movement thereof.

9. Vehicle as claimed in claim 8, wherein said mechanical linkage comprise delay means for causing retarded and restricted follower movement of said trailing flap compared with the movement of said leading flap.

10. Vehicle as claimed in claim 8, further comprising dashpot means associated with said mechanically linked flaps for damping vibrations thereof.

11. Vehicle as claimed in claim 1, further comprising a transverse intermediate flap depending from an intermediate portion of said ceiling structure and forming a partition wall subdividing said cushion system into a forward cushion extending between said leading flap and said intermediate flap, and a rearward cushion extending between said intermediate flap and said trailing flap, said intermediate flap being rearwardly pivotable as said vehicle gathers speed.

12. Vehicle as claimed in claim 11, further comprising a mechanical linkage associated with said three flaps for synchronizing movement thereof.

13. Vehicle as claimed in claim 11, wherein said static pump system comprises at least one pivotal static pump in a forward part of said ceiling structure extending over said forward cushion and at least one pivotal static pump in a rearward part of ceiling structure extending over said rearward cushion.

* * * * *